US010818893B2

(12) United States Patent
Ryou et al.

(10) Patent No.: US 10,818,893 B2
(45) Date of Patent: Oct. 27, 2020

(54) AIR-ZINC BATTERY ASSEMBLY

(71) Applicant: E.M.W.ENERGY CO., LTD., Seoul (KR)

(72) Inventors: Byoung Hoon Ryou, Seoul (KR); Jae Kyung Kong, Seoul (KR)

(73) Assignee: E.M.W.ENERGY CO., LTD., Seoul (KR)

( * ) Notice: Subject to any disclaimer, the term of this patent is extended or adjusted under 35 U.S.C. 154(b) by 212 days.

(21) Appl. No.: 15/768,372

(22) PCT Filed: Oct. 13, 2016

(86) PCT No.: PCT/KR2016/011460
§ 371 (c)(1),
(2) Date: Apr. 13, 2018

(87) PCT Pub. No.: WO2017/065504
PCT Pub. Date: Apr. 20, 2017

(65) Prior Publication Data
US 2018/0309098 A1 Oct. 25, 2018

(30) Foreign Application Priority Data

Oct. 14, 2015 (KR) .................. 10-2015-0143712

(51) Int. Cl.
*H01M 2/26* (2006.01)
*H01M 12/06* (2006.01)
(Continued)

(52) U.S. Cl.
CPC ........... *H01M 2/1016* (2013.01); *H01M 2/10* (2013.01); *H01M 2/1077* (2013.01); *H01M 2/20* (2013.01);
(Continued)

(58) Field of Classification Search
None
See application file for complete search history.

(56) References Cited

U.S. PATENT DOCUMENTS

| 4,002,808 A * | 1/1977 | Fafa ........................ H01M 2/30 429/157 |
| 8,828,586 B2 * | 9/2014 | Park .................... H01M 2/0413 429/156 |

(Continued)

FOREIGN PATENT DOCUMENTS

| JP | 61-151964 A | 7/1986 |
| JP | 2006-313733 A | 11/2006 |

(Continued)

OTHER PUBLICATIONS

International Search Report for PCT/KR2016/011460, dated Feb. 22, 2017.

(Continued)

*Primary Examiner* — Tracy M Dove
(74) *Attorney, Agent, or Firm* — The PL Law Group, PLLC (57) ABSTRACT

An air-zinc battery assembly includes a first air-zinc battery module that has a first coupling portion which is embossed or engraved, one or more second air-zinc battery modules that has a second coupling portion which is embossed or engraved so as to be fastened in engagement with the first coupling portion, and a third coupling portion which is embossed or engraved, and a power draw module that has a fourth coupling portion which is embossed or engraved so as to be fastened in engagement with the third coupling portion.

12 Claims, 7 Drawing Sheets

(51) Int. Cl.

| | | |
|---|---|---|
| *H01M 10/6563* | (2014.01) | |
| *H01M 2/10* | (2006.01) | |
| *H01M 10/6556* | (2014.01) | |
| *H01M 2/20* | (2006.01) | |
| *H01M 4/42* | (2006.01) | |
| *H01M 2/30* | (2006.01) | |
| *H01M 12/08* | (2006.01) | |

(52) U.S. Cl.
CPC ............ *H01M 2/202* (2013.01); *H01M 2/26* (2013.01); *H01M 2/30* (2013.01); *H01M 4/42* (2013.01); *H01M 10/6556* (2015.04); *H01M 10/6563* (2015.04); *H01M 12/06* (2013.01); *H01M 12/08* (2013.01); *Y02E 60/10* (2013.01)

(56) References Cited

U.S. PATENT DOCUMENTS

| | | | |
|---|---|---|---|
| 2003/0049527 A1* | 3/2003 | Yageta | H01M 2/06 429/179 |
| 2008/0305375 A1 | 12/2008 | Yang et al. | |
| 2010/0025137 A1 | 2/2010 | Mughal | |
| 2012/0021303 A1 | 1/2012 | Amendola et al. | |

FOREIGN PATENT DOCUMENTS

| | | |
|---|---|---|
| JP | 2008-066246 A | 3/2008 |
| JP | 2009-110894 A | 5/2009 |
| JP | 2010-232102 A | 10/2010 |
| KR | 10-2004-0073932 A | 8/2004 |
| KR | 10-2005-0024064 A | 3/2005 |
| KR | 10-1227654 B1 | 1/2013 |
| KR | 10-2013-0016629 A | 2/2013 |
| KR | 10-2013-0093094 A | 8/2013 |
| KR | 10-2013-0098573 A | 9/2013 |
| KR | 10-2014-0114130 A | 9/2014 |
| KR | 10-2014-0117743 A | 10/2014 |
| WO | WO 97/44848 A1 | 11/1997 |
| WO | WO 98/53517 A1 | 11/1998 |
| WO | WO2012-132134 A1 | 10/2012 |

OTHER PUBLICATIONS

Office action dated May 7, 2019 from Japan Intellectual Property Office in a counterpart Japanese Patent Application No. 2018-518407 (all the cited references are listed in this IDS.).
European Search Report for EP16855721 dated May 13, 2019 from European patent office in a counterpart European patent application.
Office action dated May 18, 2017 from Korean Patent Office in a counterpart Korean Patent Application No. 10-2016-0053457 (all the cited references are listed in this IDS.) (English translation is also submitted herewith.).

* cited by examiner

AIR-ZINC BATTERY ASSEMBLY

CROSS REFERENCE TO RELATED
APPLICATIONS AND CLAIM OF PRIORITY

This application claims benefit under 35 U.S.C. 119(e), 120, 121, or 365(c), and is a National Stage entry from International Application No. PCT/KR2016/011460, filed Oct. 13, 2016, which claims priority to the benefit of Korean Patent Application No. 10-2015-0143712 filed in the Korean Intellectual Property Office on Oct. 14, 2015, the entire contents of which are incorporated herein by reference.

TECHNICAL FIELD

The present invention relates to an air-zinc battery assembly applicable to electric appliances for various purposes such as household purposes, industrial purposes, and military purposes.

BACKGROUND ART

A battery is widely used as a means for supplying power to electric apparatuses. For example, primary batteries such as a manganese battery, an alkaline manganese battery, and a zinc-air battery, and secondary batteries such as a nickel-cadmium (Ni—Cd) battery, a nickel-hydrogen (Ni—H) battery, and a lithium ion battery have been used as the battery.

Among these batteries, the air-zinc battery supplies a relatively high voltage of 1.4 V and has advantages such as high energy density and large discharge capacity. In addition, since the air-zinc battery exhibits almost constant discharge characteristics until discharging thereof is completed, it is considered that the air-zinc battery can replace a mercury battery, of which use is inhibited due to heavy metals contained in the mercury battery.

In order for the air-zinc battery to be applicable to electric appliances for various purposes such as household purposes, industrial purposes, and military purposes, the air-zinc battery is commonly manufactured in the form of an air-zinc battery module which includes minimum battery units, i.e., a plurality of air-zinc battery cells to meet required voltage and current specifications. Since the air-zinc battery module includes the plurality of air-zinc battery cells, a fan device is essentially required to uniformly supply air to all the air-zinc battery cells in the air-zinc battery module. In addition, electric wiring, a power supply, and a switching structure for supplying power to the fan are also important parts so as to miniaturize a battery module product and maximize a lifespan of the battery module product.

Meanwhile, since a high current is required to drive a large home appliance such as a refrigerator or an electric vehicle, in order for the air-zinc battery to be applied to the large home appliance or the electric vehicle, the air-zinc battery modules should be connected in parallel to meet a current specification required in a corresponding product.

However, an existing air-zinc battery product has a limitation in that since a required current specification varies according to products, it is necessary to find or manufacture an air-zinc battery module or assembly meeting a current specification of a corresponding product for every product. In addition, the existing air-zinc battery product has a limitation in that a single air-zinc battery module or assembly may not be universally applied to various types of electric products.

SUMMARY

The present invention has been made in order to solve the above problems, and is directed to providing an air-zinc battery assembly in which even a single air-zinc battery assembly can be easily and simply customized to various electric products having different required current specifications by anyone.

Further, objects of the present invention are not limited to the above-mentioned object. Other objects that are not mentioned may be obviously understood by those skilled in the art to which the present invention pertains from the following description.

One aspect of the present invention provides an air-zinc battery assembly including: a first air-zinc battery module having a 1A coupling portion formed to be embossed or engraved on one surface thereof; at least one second air-zinc battery module having a 1B coupling portion formed to be embossed or engraved on one surface thereof and be engaged with and coupled to the 1A coupling portion, and a 2A coupling portion formed to be embossed or engraved on the other surface thereof; and a power draw module having a 2B coupling portion formed to be embossed or engraved on one surface thereof and be engaged with and coupled to the 2A coupling portion.

The 1A coupling portion and the 2A coupling portion may have the same shape, the 1B coupling portion and the 2B coupling portion may have the same shape, and widths of the 1A coupling portion, each of the 1B and 2A coupling portions, and the 2B coupling portion may be gradually reduced as going away from outer surfaces of the first air-zinc battery module, the second air-zinc battery module, and the power draw module, respectively.

A first female switching connector may be formed in one region of the 1A coupling portion to transmit electric energy generated in the first air-zinc battery module, a first male switching connector connected to the first female switching connector may be formed in one region of the 1B coupling portion, a second female switching connector may be formed in one region of the 2A coupling portion to transmit electric energy generated in the first and second air-zinc battery modules, and a second male switching connector connected to the second female switching connector may be formed in one region of the 2B coupling portion.

The first air-zinc battery module may include a first case having an accommodation space formed therein and one surface on which the 1A coupling portion is formed; a first battery unit group installed in the accommodation space inside the first case and formed by connecting a plurality of battery units which are each formed by connecting and stacking a plurality of air-zinc battery cells; a first fan installed in the accommodation space inside the first case to guide an air flow; and the first female switching connector electrically connected to the first battery unit group and the first fan.

The first female switching connector may have two positive terminals and one negative terminal, one positive terminal of the positive terminals of the first female switching connector may be connected to a positive electrode of the first battery unit group, the other positive terminal of the positive terminals of the first female switching connector may be connected to a positive terminal of the first fan, and the negative terminal of the first female switching connector may be connected to a negative electrode of the first battery unit group and a negative terminal of the first fan.

The negative terminal of the first female switching connector may be connected to the negative electrode of the first battery unit group through electric wiring, and the electric wiring connecting the negative terminal of the first female switching connector and the negative electrode of the first battery unit group may be connected to the negative terminal of the first fan in a side branch form.

The second air-zinc battery module may include a second case having an accommodation space formed therein, one surface on which the 1B coupling portion is formed, and the other surface on which the 2A coupling portion is formed; a second battery unit group installed in the accommodation space inside the second case and formed by connecting a plurality of battery units which are each formed by connecting and stacking a plurality of air-zinc battery cells; a second fan installed in the accommodation space inside the second case to guide an air flow; the first male switching connector connected to the first female switching connector when the 1A coupling portion and the 1B coupling portion are coupled; and the second female switching connector electrically connected to the second battery unit group and the second fan.

The first male switching connector may have two positive terminals and one negative terminal provided so as to be connected to the terminals of the first female switching connector, the two positive terminals of the first male switching connector may be electrically connected to each other, the positive terminal of the positive terminals of the first male switching connector, which is not connected to the positive terminal of the first female switching connector connected to the positive terminal of the first fan, may be connected to a positive electrode of the second battery unit group, and the negative terminal of the first male switching connector may be connected to a negative electrode of the second battery unit group and a negative terminal of the second fan.

The second female switching connector may have two positive terminals and one negative terminal, one positive terminal of the positive terminals of the second female switching connector may be connected to a positive electrode of the second battery unit group, the other positive terminal of the positive terminals of the second female switching connector may be connected to a positive terminal of the second fan, and the negative terminal of the second female switching connector may be connected to a negative electrode of the second battery unit group and the negative terminal of the second fan.

The negative terminal of the second female switching connector may be connected to the negative electrode of the second battery unit group through electric wiring, and the electric wiring connecting the negative terminal of the second female switching connector and the negative electrode of the second battery unit group may be connected to the negative terminal of the second fan in a side branch form.

The power draw module may include a third case having an accommodation space formed therein and one surface on which the 2B coupling portion is formed; a socket portion installed in the accommodation space inside the third case such that a plug of an external electric device is connected thereto; an inverter installed in the accommodation space inside the third case and electrically connected to the socket portion; and the second male switching connector connected to the second female switching connector when the 2A coupling portion and the 2B coupling portion are coupled.

The second male switching connector may have two positive terminals and one negative terminal provided so as to be connected to the terminals of the second female switching connector, the two positive terminals of the second male switching connector may be electrically connected to each other, the positive terminal of the positive terminals of the second male switching connector, which is not connected to the positive terminal of the second female switching connector connected to the positive terminal of the second fan, may be connected to a positive electrode of the inverter, and the negative terminal of the second male switching connector may be connected to a negative electrode of the inverter.

According to an air-zinc battery assembly according to an exemplary embodiment of the present invention, since air-zinc battery modules are easily stacked and used in accordance with a current specification required in an electric appliance to which the air-zinc battery modules are applied, even a single air-zinc battery assembly can be easily and simply customized to various electric products having different current specifications.

DETAILED DESCRIPTION

As the present invention allows for various changes and numerous embodiments, exemplary embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the embodiments. In description of the embodiments, certain detailed explanations of the related art are omitted when it is deemed that they may unnecessarily obscure the essence of the present invention.

It is to be understood that terms employed herein are for the purpose of description of particular embodiments and not of limitation. The singular forms "a" and "an" include plural referents unless otherwise stated. Further, it should be understood that terms "include" or "have" are inclusive of characteristics, numerals, steps, operations, elements, parts or combinations thereof, which are described herein, bur are not exclusive of existence or possible addition of one or more different characteristics, numerals, steps, operations, elements, parts or combinations thereof.

Although the terms "first", "second", etc. are used herein to describe various elements, these elements should not be limited by these terms. These terms are only used for the purpose of distinguishing one element from another.

Hereinafter, the present invention will be described in detail, and if necessary, the present invention will be described in detail with reference to the drawings. The following drawings are a mere example which is provided for more understanding of the present invention but does not limit the scope of the present invention.

Terms and configurations as used herein are defined as follows prior to a description of the present invention.

In the present invention, it is meant that an air-zinc battery module includes a plurality of battery units which are each formed by connecting in series and stacking a plurality of air-zinc battery cells in a case, wherein the battery units are connected in series to battery units adjacent thereto to form at least one battery unit group, and a fan having a positive terminal and a negative terminal and guiding an air flow is provided in one area in the case, which is not exposed to the outside.

In the present invention, the air-zinc battery cell is a minimum unit constituting the air-zinc battery module according to the present invention. Generally known in the art, the air-zinc battery cell has an internal structure in which an air positive electrode portion including an air diffusion layer, a catalyst active layer, and the like, a negative electrode portion including an zinc gel which is a mixture of zinc and an electrolyte, and the like, and a separator disposed to prevent a short circuit between the air positive electrode portion and the negative electrode portion are located.

In the present invention, the air-zinc battery cell may have any shape. However, in order to form the battery units in a stacked structure in consideration of space efficiency, it is structurally desirable to use a plate-shaped air-zinc battery cell.

Figure 8:
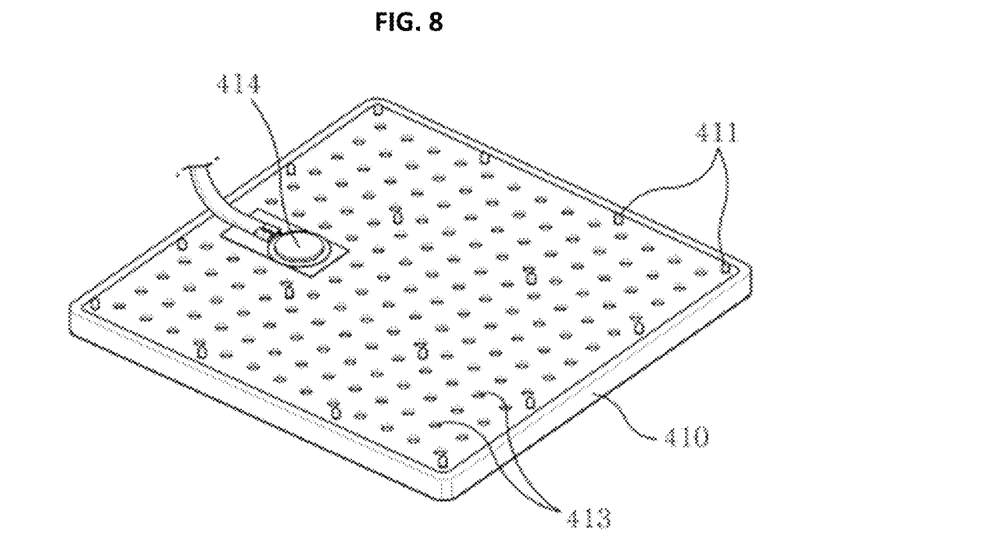
FIG. 8 illustrates an air-zinc battery cell according to an exemplary embodiment of the present invention.

For better understanding of the air-zinc battery cell, a description will be made through an example shown in FIG. 8, and as shown in FIG. 8, an air-zinc battery cell 410 has a plate shape, and a plurality of air holes 413 are formed in a surface of an air positive electrode portion side of the air-zinc battery cell 410 such that air flows into the air-zinc battery cell 410 from the outside.

Figure 9:
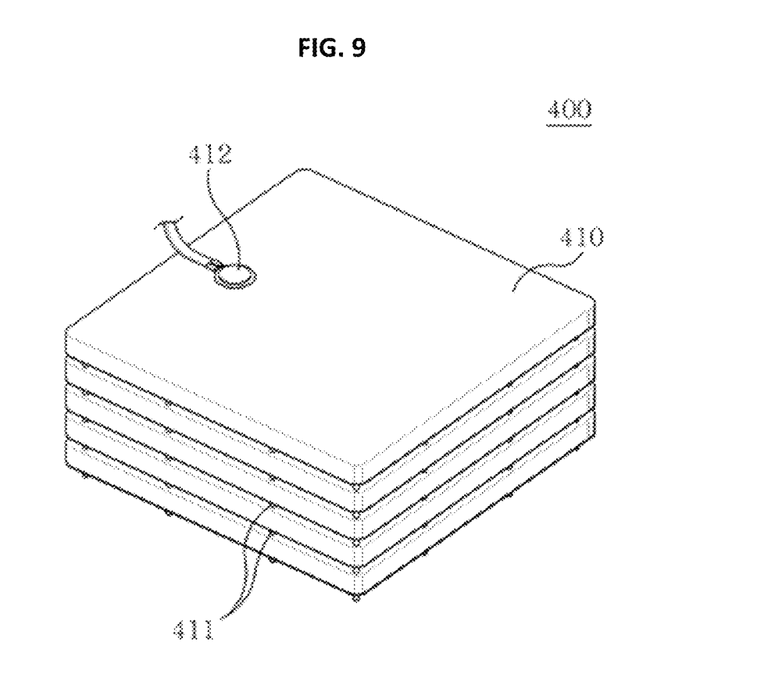
FIG. 9 is a perspective view illustrating a battery unit according to an exemplary embodiment of the present invention.

In addition, due to spacers 411 having a protrusion shape, formed in the surface of the air positive electrode portion side of the air-zinc battery cell 410, when a battery unit 400 is formed by stacking the air-zinc battery cells 410 as shown in FIG. 9, a space, through which air smoothly flows, may be formed between the stacked air-zinc battery cells 410. Accordingly, air can be smoothly supplied to each of the air-zinc battery cells 410 constituting the battery unit 400, and an air flow can also be smoothly performed in the case of the air-zinc battery module according to the present invention.

In the present invention, the battery unit has a structure in which a plurality of air-zinc battery cells are electrically connected in series and are each stacked. In the present invention, since the plurality of air-zinc battery cells are connected in series to form one battery unit, in order for the battery unit to be applicable to electric appliances for various purposes such as household purposes, industrial purposes, and military purposes, the battery unit has an advantage in increasing a voltage thereof. Describing an example with reference to FIG. 9, FIG. 9 is a perspective view illustrating a battery unit according to an exemplary embodiment of the present invention. As shown in FIG. 9, a battery unit 400 according to the present invention has a structure in which five air-zinc battery cells 410 are connected in series and are stacked. When each of the air-zinc battery cells 410 has a voltage of 1.3 V to 1.4 V, the battery unit 400 may have a voltage of 6 V or more.

In the present invention, the number of the air-zinc battery cells constituting a single battery unit is not particularly limited. The number of the air-zinc battery cells per single battery unit may be arbitrarily determined according to purposes in which the air-zinc battery module according to the present invention is used.

In the present invention, the battery unit group is an assembly formed by stacking air-zinc battery cells in series to form each of battery units and connecting the battery units in series. As a result, since voltages of the battery units are added up, the battery unit group according to the present invention can have a voltage which is as high as the number of the battery units included therein. The air-zinc battery module according to the present invention may include at least one battery unit group. When the air-zinc battery module includes two or more battery unit groups, the battery unit groups can be electrically connected in parallel to each other, thereby increasing a current value in accordance with a specification of an electric appliance to which the air-zinc battery module is applied.

In the present invention, the fan functions to guide an external air flow into the air-zinc battery module and uniformly supply air to the battery units which each include the plurality of air-zinc battery cells in the air-zinc battery module. In the present invention, since the fan is located inside the case of the air-zinc battery module unlike an existing air-zinc battery module, it is possible to prevent a reduction in an air flow rate caused by contamination of a fan blade due to exposure of the fan to the outside and a decrease in performance of a battery module due to the reduction in the air flow rate, occurring in the existing air-zinc battery module. In addition, it is possible to minimize noise caused by the fan, occurring in the existing battery module.

Furthermore, according to the present invention, in order to guide an air flow and supply air to all the battery units in the air-zinc battery module as uniformly as possible according to the number and arrangement configuration of the battery units and the battery unit groups included in the air-zinc battery module, it is important to appropriately set an arrangement position, an arrangement direction, and the like of the fan in the battery module according to the number and arrangement configuration of the battery units and the battery unit groups.

When the battery units are arranged in a line and connected in series to battery units adjacent thereto to form one battery unit group in the battery module, in order to guide an air flow and supply air to all the battery units in the battery module as uniformly as possible, it is desirable that the fan is provided between all or some of the battery units and a direction of the fan is the same as a direction of a rotation axis of a blade and an arrangement direction of the line of the battery units. For better understanding, a description will be made with reference to an example shown in FIG. 10.

Figure 10:
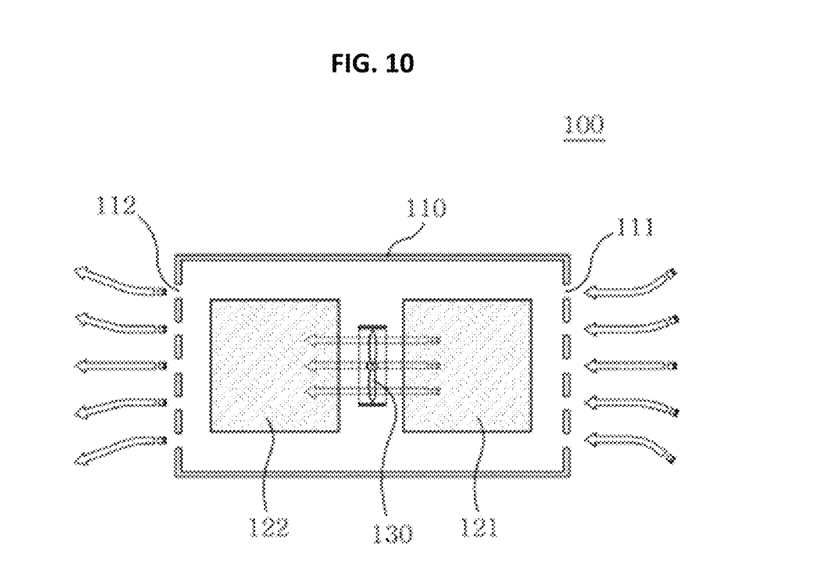
FIG. 10 illustrates an arrangement structure of a fan of an air-zinc battery module according to an exemplary embodiment of the present invention.

As shown in FIG. 10, in an air-zinc battery module 100 according to an exemplary embodiment of the present invention, two battery units 121 and 122 are arranged in a line and connected in series in a case 110 to form one battery unit group, a fan 130 is located between the battery units 121 and 122 to guide an air flow in the module, and a direction of the fan 130 is set to be the same as a direction of a rotation axis of a blade and an arrangement direction of the line of the battery units 121 and 122. Since the position and direction of the fan 130 is set as described above, air can be uniformly supplied even to the battery unit 122 located in an air discharge portion in the battery module when external air is guided into the battery module. As in the existing air-zinc battery module, when one fan 130 is provided only in an entrance side of the module through which external air is introduced, air cannot be uniformly supplied to the battery unit 122 located in the air discharge portion in the battery module. Thus, this causes an air supply unbalance between the battery units, resulting in a decrease in overall performance of the battery module.

In another example, air holes are formed in one side surface of the case of the air-zinc battery module of the present invention such that air flows into the air-zinc battery module from the outside, and battery units in the battery module form two battery unit groups including a first battery unit group and a second battery unit group, wherein the first battery unit group and the second battery unit group are configured to be arranged in parallel with a partition in-between and be connected in parallel to each other through electric wiring. When the partition is formed perpendicular to the surface of the case, in which the air holes are formed, the fan may be formed to penetrate a portion of the partition and may be located between the battery units located farthest from the surface of the case in which the air holes are formed, among the battery units of the first battery unit group and the second battery unit group. In addition, a direction of the fan may be set such that a direction of a rotation axis of a blade is perpendicular to the surface of the partition, thereby uniformly supplying air to all the battery units in the battery module. For better understanding, a description will be made with reference to an example shown in FIG. 11.

Figure 3:
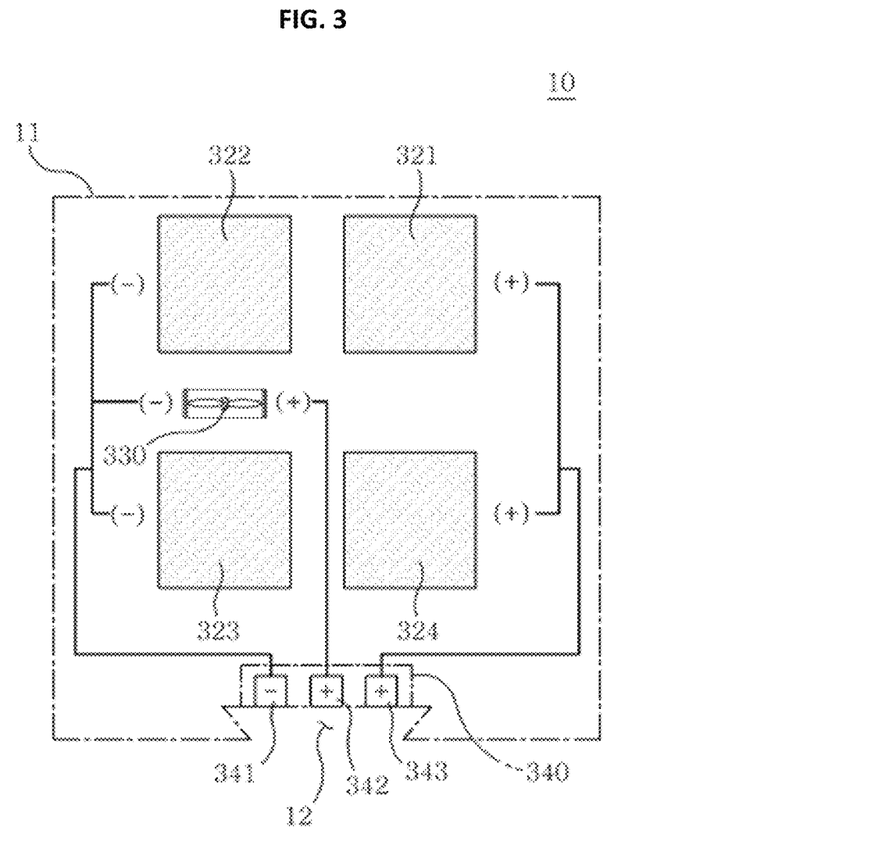
FIG. 3 illustrates an electric wiring connection structure of an example of the first air-zinc battery module according to the present invention.
Figure 11:
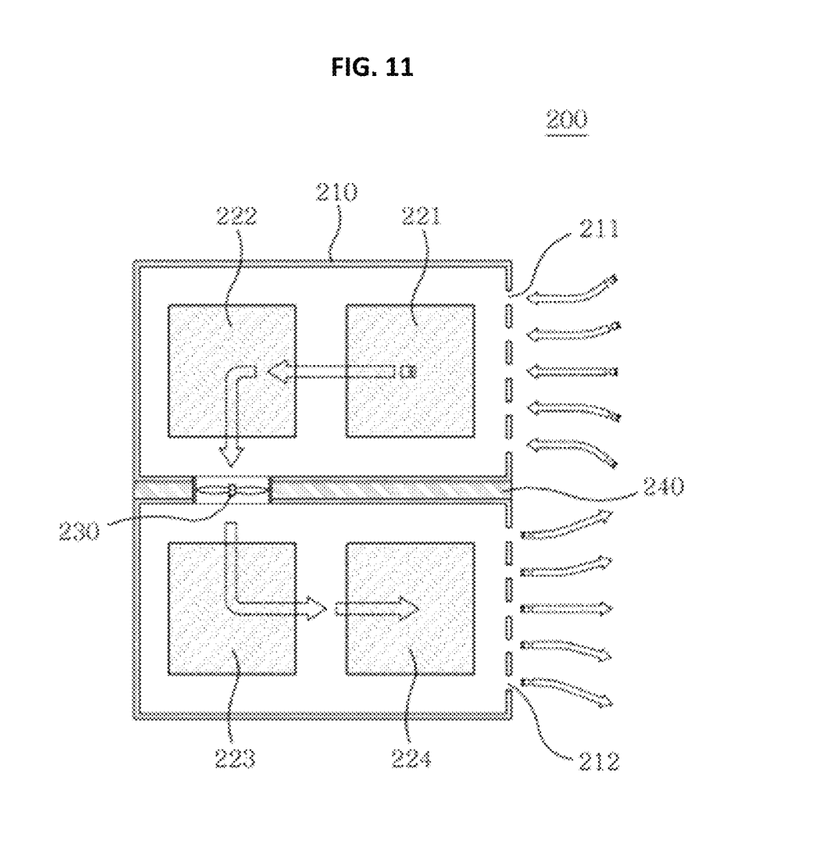
FIG. 11 illustrates an arrangement structure of a fan of an air-zinc battery module according to another exemplary embodiment of the present invention.

In an air-zinc battery module 200 according to an exemplary embodiment of the present invention shown in FIG. 11, air holes 211 and 212 are formed in one side surface of a case 210 such that external air flows into the battery module, and four battery units 221, 222, 223, and 224 are provided in the air-zinc battery module 200. The two battery units 221 and 222 at one side are connected in series to each other and arranged in a line to form a first battery unit group and the two battery units 223 and 224 at the other side are connected in series to each other and arranged in a line to form a second battery unit group, interposing a partition 240 formed at a center of the battery module so as to be perpendicular to the surface of the case 210, in which the air holes 211 and 212 are formed, between the first and second battery unit groups. As shown in FIG. 3, a fan 230 is formed to penetrate a portion of the partition 240 and is located between the battery units 222 and 223 located farthest from the surface of the case 210 in which the air holes 211 and 212 are formed, among the battery units of the first battery unit group and the second battery unit group. A direction of the fan 230 is set such that a direction of a rotation axis of a blade is perpendicular to a surface of the partition 240. Accordingly, even when only one fan is provided in the air-zinc battery module, according to a structure shown in FIG. 11, air introduced from the outside can be guided to sequentially flow from the first battery unit 221 to the final battery unit 224 in a U shape and can be discharged to the outside of the battery module, thereby uniformly supplying air to all the battery units 221, 222, 223, and 224 in the battery module.

That is, according to an arrangement structure of the fan according to the present invention, when a battery module having the same performance is implemented, it is possible to use a fan having a blowing force much lower than that of an existing one. Accordingly, it is possible to considerably reduce consumption power consumed to drive the fan.

In the present invention, since the fan uses electric energy as a power source, the fan has a positive terminal and a negative terminal such that electric wiring is connected thereto.

In the present invention, a female switching connector is formed in one region of one surface of the case in the air-zinc battery module. The female switching connector has two positive terminals and one negative terminal formed therein. One positive terminal of the positive terminals of the female switching connector is connected to a positive electrode at a positive side end of the battery unit group through electric wiring, and the other positive terminal of the positive terminals of the female switching connector is connected to the positive terminal formed in the fan through electric wiring.

The negative terminal of the female switching connector is connected to a negative electrode at a negative side end of the battery unit group through electric wiring. In order to use a portion of electricity generated in the air-zinc battery module as driving energy of the fan, the electric wiring connected to the negative terminal of the female switching connector is connected to the negative terminal of the fan in a side branch form. That is, according to the present invention, since a separate heavy battery device is not required to drive the fan in the battery module, a structure of a product can be simplified and weight thereof can be reduced compared to existing products.

In the present invention, the female switching connector may be connected to and disconnected from a male switching connector electrically connected to a battery unit of an air-zinc battery module or an inverter of a power draw module, which is disposed directly thereunder. The male switching connector has two positive terminals and one negative terminal formed so as to correspond to the terminals of the female switching connector. The positive terminals of the male switching connector are connected to each other through electric wiring. Due to the structural characteristics, when the male switching connector is connected to the female switching connector, a current may flow in the battery units, and concurrently, the fan may be electrically connected to the battery units and thus be driven. When the male switching connector is disconnected, the current flow in the battery units may be stopped and the driving of the fan may be stopped. That is, unlike existing battery module products, in the air-zinc battery module according to the present invention, a separate switching device is not required to drive and stop the fan, thereby improving space efficiency inside the battery module to miniaturize a product, simplifying electric wiring, and reducing manufacturing costs. In addition, since driving control of the fan is performed only by connecting and disconnecting the switching connector, it is possible to prevent a lifespan of the battery module from being reduced due to unnecessary discharging of the battery module occurring when the fan is not accidentally turned off as in existing products.

The present invention relates to an air-zinc battery assembly, and more particularly, to an air-zinc battery assembly having a structure in which N air-zinc battery modules are sequentially stackable on a power draw module. A first air-zinc battery module from above has an engraved coupling portion formed on a lower surface thereof, to which an embossed coupling portion can be inserted into and coupled, the embossed coupling portion being formed on an upper surface of an air-zinc battery module or a power draw module, which is stacked directly under the first air-zinc battery module. Each of second to $N^{th}$ air-zinc battery modules from above has an embossed coupling portion formed on an upper surface thereof, which can be inserted into and coupled to an engraved coupling portion formed on a lower surface of an air-zinc battery module which is stacked directly on each of the second to $N^{th}$ air-zinc battery modules. Each of the second to $N^{th}$ air-zinc battery modules has an engraved coupling portion formed on a lower surface thereof, to which an embossed coupling portion can be inserted into and coupled, the embossed coupling portion being formed on an upper surface of an air-zinc battery module or a power draw module, which is stacked directly below each of the second to $N^{th}$ air-zinc battery modules. The power draw module has an embossed coupling portion formed on an upper surface thereof, which can be inserted into and coupled to an engraved coupling portion formed on a lower surface of an air-zinc battery module which is stacked directly thereon.

For better understanding of the air-zinc battery assembly according to the present invention, a description will be made with reference to an example shown in FIG. 1.

Figure 1:
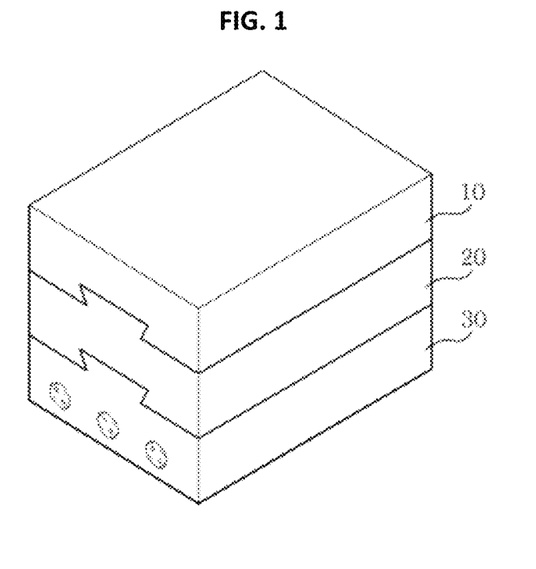
FIG. 1 illustrates an example of a coupled form of an air-zinc battery assembly according to the present invention.

FIG. 1 illustrates an example of a coupled form of the air-zinc battery assembly according to the present invention. As shown in FIG. 1, the air-zinc battery assembly has a structure in which two air-zinc battery modules 10 and 20 are stacked and coupled on a power draw module 30. An embossed coupling portion 22 formed in an embossed shape so as to protrude from an upper surface of the second air-zinc battery module 20 is inserted into an engraved coupling portion 12 formed in an engraved shape on a lower surface of the first air-zinc battery module 10, and thus, the first air-zinc battery module 10 and the second air-zinc battery module 20 are coupled to each other. In addition, as shown in FIG. 1, an embossed coupling portion 32 having an embossed shape formed on an upper surface of the power draw module 30 is inserted into an engraved coupling portion 23 formed in an engraved shape on a lower surface of the second air-zinc battery module 20, and thus, the second air-zinc battery module 20 and the power draw module 30 are coupled to each other.

The first air-zinc battery module will be described in detail with reference to FIGS. 2 and 3.

Figure 2:
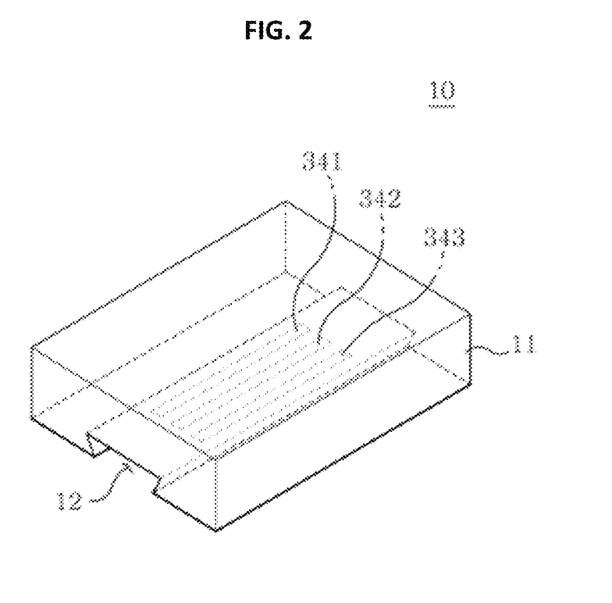
FIG. 2 is a perspective view illustrating an example of a first air-zinc battery module according to the present invention.

As shown in FIG. 2, the engraved coupling portion 12 of the first air-zinc battery module 10 is formed in one region of a lower surface of a case 11, and electrode terminals 341, 342, and 343 are formed in the one region of the lower surface of the case. A shape of the case 11 is not particularly limited, and the case 11 may have various shapes such as a rectangular shape and a cylindrical shape. The engraved coupling portion 12 may have any shape as long as the shape is an engraved structure. In addition, any shape and position of the electrode terminals 341, 342, and 343 are possible as long as the shape and position are exposed at the one region of the lower surface of the case 11. In an example of FIG. 2, the electrode terminals 341, 342, and 343 have a bar shape and are exposed at a portion of the lower surface of the case 11, at which the engraved coupling portion 12 is located.

Describing an internal structure of the first air-zinc battery module, the first air-zinc battery module includes a plurality of battery units which are each formed by connecting in series and stacking a plurality of air-zinc battery cells in the case. The battery units are connected in series to battery units adjacent thereto to form at least one battery unit group. A fan having a positive terminal and a negative terminal and guiding an air flow is provided in one area in the case, which is not exposed to the outside. A female switching connector having two positive terminals and one negative terminal is formed in one region of the lower surface of the case. The female switching connector may be connected to a male switching connector of an air-zinc battery module or a power draw module, which is stacked directly thereunder. One positive terminal of the positive terminals of the female switching connector is connected to a positive electrode at a positive side end of the battery unit group through electric wiring, and the other positive terminal of the positive terminals of the female switching connector is connected to the positive terminal of the fan through electric wiring. The negative terminal of the female switching connector is connected to a negative electrode at a negative side end of the battery unit group through electric wiring. The electric wiring connected to the negative terminal of the female switching connector is connected to the negative terminal of the fan in a side branch form.

For further understanding of an internal electric wiring structure of the first air-zinc battery module, a description will be made through an example shown in FIG. 3. FIG. 3 illustrates an electric wiring connection structure of an example of the first air-zinc battery module (including four battery units) according to the present invention. As shown in FIG. 3, a first battery unit group 321 and 322 and a second battery unit group 323 and 324 are connected in parallel to each other through electric wiring. A positive electrode at a positive side end of each of the battery unit groups is connected, through electric wiring, to one positive terminal 343 of two positive terminals of a female switching connector 340 located in a case such that the electrode terminals 341, 342, and 343 are exposed at a portion of a lower surface of the case 11, at which an engraved coupling portion 12 is located. A negative electrode at a negative side end of each of the battery unit groups is connected to one negative terminal 341 formed in the female switching connector 340 through electric wiring. In addition, a positive terminal formed in a fan 330 is connected to the other positive terminal 342 of the two positive terminals formed in the female switching connector 340 through electric wiring. A negative terminal formed in the fan 330 is connected to the negative terminal of the female switching connector 340 in a side branch form branched from the electric wiring connected to the negative terminal of the female switching connector 340.

The second to $N^{th}$ air-zinc battery modules will be described in detail with reference to FIGS. 4 and 5.

Figure 4:
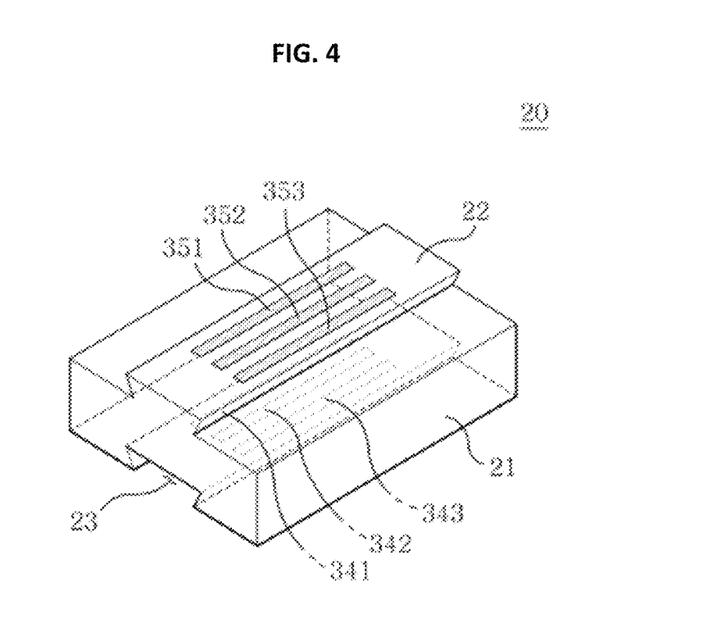
FIG. 4 is a perspective view illustrating an example of each of second to $N^{th}$ air-zinc battery modules according to the present invention.

As shown in FIG. 4, an embossed coupling portion 22 of each of the second to $N^{th}$ air-zinc battery modules 20 is formed in one region of an upper surface of a case 21, and electrode terminals 351, 352, and 353 are formed in one region of the upper surface of the case 21. In addition, an engraved coupling portion 23 is formed in one region of a lower surface of the case 21, and electrode terminals 341, 342, and 343 are formed in one region of the lower surface of the case. A shape of the case 21 is not particularly limited, and the case 21 may have various shapes such as a rectangular shape and a cylindrical shape. The embossed coupling portion 22 may have any shape as long as the shape is an embossed structure, and the engraved coupling portion 23 may have any shape as long as the shape is an engraved structure. The embossed coupling portion 22 and the engraved coupling portion 23 each desirably have a shape corresponding to an embossed coupling portion or an engraved coupling portion of an air-zinc battery module or a power draw module, which is stacked directly on or under each of the second to $N^{th}$ air-zinc battery modules 20, so as to be fixed and coupled when each of the embossed coupling portions is inserted into each of the engraved coupling portions.

Any shape and position of the electrode terminals 351, 352, and 353 formed on the upper surface are possible as long as the shape and position are exposed at the one region of the upper surface of the case 21. It is desirable that the electrode terminals 351, 352, and 353 are located at a position capable of contacting electrode terminals formed on a lower surface of an air-zinc battery module stacked directly thereon. In an example of FIG. 4, the electrode terminals 351, 352, and 353 have a bar shape and are exposed at a portion of the upper surface of the case 21, at which the embossed coupling portion 22 is located.

In addition, any shape and position of the electrode terminals 341, 342, and 343 formed on the lower surface are possible as long as the shape and position are exposed at the one region of the lower surface of the case 21. It is desirable that the electrode terminals 341, 342, and 343 are located at a position capable of contacting electrode terminals formed on an upper surface of an air-zinc battery module or a power draw module, which is stacked directly thereunder. In the example of FIG. 4, the electrode terminals 341, 342, and 343 have a bar shape and are exposed at a portion of the lower surface of the case 21, at which the engraved coupling portion 23 is located.

Describing an internal structure of each of the second to $N^{th}$ air-zinc battery modules, each of the second to $N^{th}$ air-zinc battery modules includes a plurality of battery units which are each formed by connecting in series and stacking a plurality of air-zinc battery cells in a case. The battery units are connected in series to battery units adjacent thereto to form at least one battery unit group. A fan having a positive terminal and a negative terminal and guiding an air flow is provided in one area in the case, which is not exposed to the outside. A male switching connector is formed in one region of an upper surface of the case so as to be connected to a female switching connector of an air-zinc battery module which is stacked directly on each of the second to $N^{th}$ air-zinc battery modules. The male switching connector has two positive terminals and one negative terminal formed so as to correspond to terminals of the female switching connector of the air-zinc battery module which is stacked directly thereon. The positive terminals of the male switching connector are connected to each other through electric wiring. The positive terminal of the positive terminals of the male switching connector, which is not connected to a positive terminal of the female switching connector connected to a positive terminal of a fan of the air-zinc battery module which is stacked directly thereon, is connected to a positive electrode at a positive side end of the battery unit group through electric wiring. The negative terminal of the male switching connector is connected to a negative electrode at a negative side end of the battery unit group through electric wiring. When the male switching connector is connected to the female switching connector of the air-zinc battery module which is stacked directly thereon, a current flows in battery units of the air-zinc battery module which is stacked directly thereon, and concurrently, the fan is driven. When the male switching connector is disconnected, the current flow is stopped in the battery units of the air-zinc battery module which is stacked directly thereon, and the driving of the fan is stopped. A female switching connector having two positive terminals and one negative terminal is formed in one region of a lower surface of the case. The female switching connector may be connected to a male switching connector of an air-zinc battery module or a power draw module, which is stacked directly thereunder. One positive terminal of the positive terminals of the female switching connector is connected to the positive electrode at the positive side end of the battery unit group through electric wiring, and the other positive terminal of the positive terminals of the female switching connector is connected to the positive terminal of the fan through electric wiring. The negative terminal of the female switching connector is connected to the negative electrode at the negative side end of the battery unit group through electric wiring. The electric wiring connected to the negative terminal of the female switching connector is connected to the negative terminal of the fan in a side branch form.

For further understanding of an internal electric wiring structure of each of the second to $N^{th}$ air-zinc battery modules, a description will be made through an example shown in FIG. 5. FIG. 5 illustrates an electric wiring connection structure of an example of each of the second to $N^{th}$ air-zinc battery modules (including four battery units) according to the present invention. As shown in FIG. 5, a first battery unit group 321 and 322 and a second battery unit group 323 and 324 are connected in parallel to each other through electric wiring. A positive electrode at a positive side end of each of the battery unit groups is connected, through electric wiring, to one positive terminal 343 of two positive terminals of a female switching connector 340 located in a case such that electrode terminals 341, 342, and 343 are exposed at a portion of a lower surface of the case 21, at which an engraved coupling portion 23 is located. A negative electrode at a negative side end of each of the battery unit groups is connected to one negative terminal 341 formed in the female switching connector 340 through electric wiring. In addition, a positive terminal formed in a fan 330 is connected to the other positive terminal 342 of the two positive terminals formed in the female switching connector 340 through electric wiring. A negative terminal formed in the fan 330 is connected to the negative terminal of the female switching connector 340 in a side branch form branched from the electric wiring connected to the negative terminal of the female switching connector 340.

Figure 5:
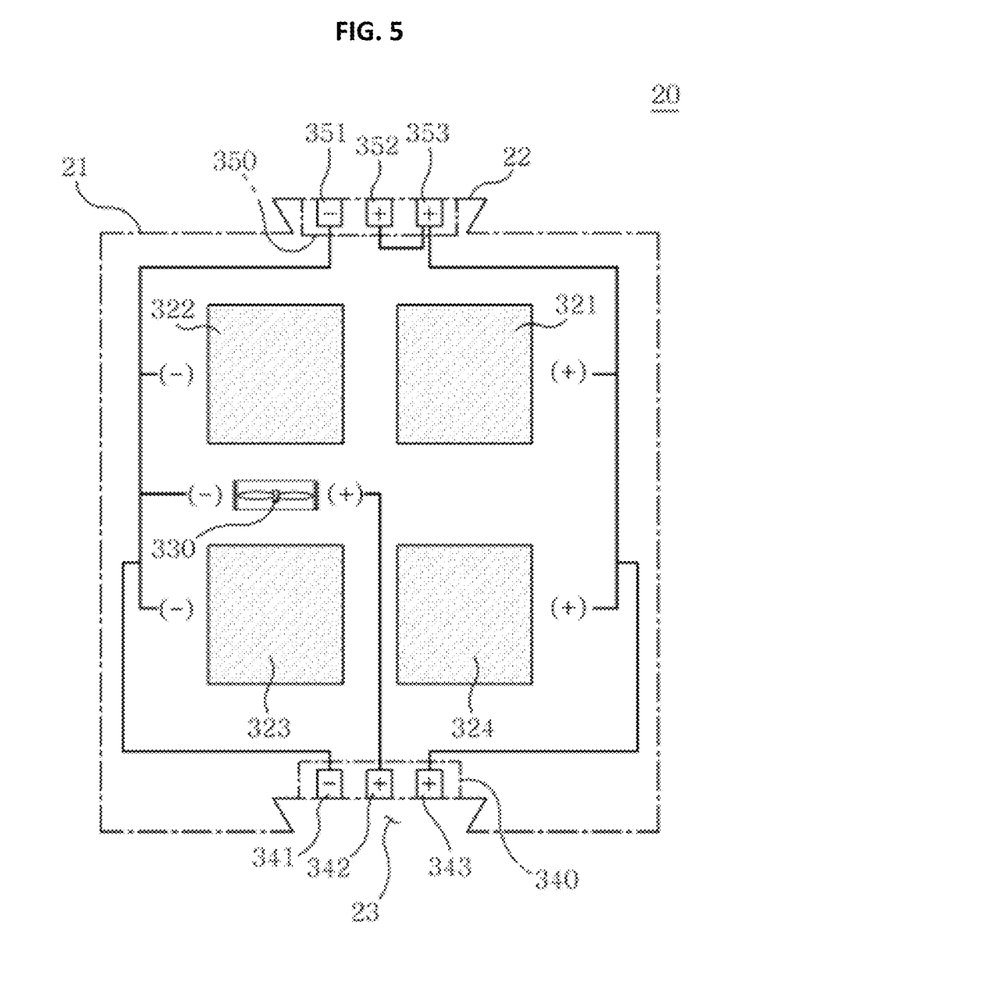
FIG. 5 illustrates an electric wiring connection structure of an example of each of second to $N^{th}$ air-zinc battery modules according to the present invention.

In addition, FIG. 5 illustrates that a male switching connector 350 is located in the case of each of the second to $N^{th}$ air-zinc battery modules such that electrode terminals 351, 352, and 353 are exposed at a portion of an upper surface of the case 21, at which an embossed coupling portion 22 is located, the male switching connector 350 being connected to a female switching connector of an air-zinc battery module stacked directly on each of the second to $N^{th}$ air-zinc battery modules. The male switching connector 350 has two positive terminals 352 and 353 and one negative terminal 351 so as to correspond to the female switching connector of the air-zinc battery module stacked directly thereon. In particular, the two positive terminals 352 and 353 of the male switching connector 350 are connected to each other through electric wiring. The positive terminal 353 of the positive terminals of the male switching connector, which is not connected to a positive terminal of the female switching connector connected to a positive terminal of a fan of the air-zinc battery module which is stacked directly thereon, is connected to a positive electrode at a positive side end of the battery unit group through electric wiring. The negative terminal 351 of the male switching connector is connected to a negative electrode at a negative side end of the battery unit group through electric wiring.

The power draw module will be described in detail with reference to FIGS. 6 and 7.

Figure 6:
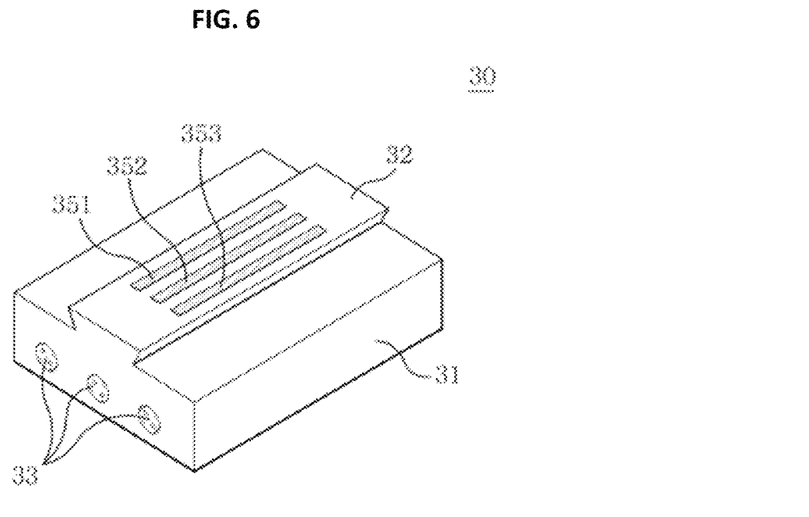
FIG. 6 is a perspective view illustrating an example of a power draw module according to the present invention.
Figure 7:
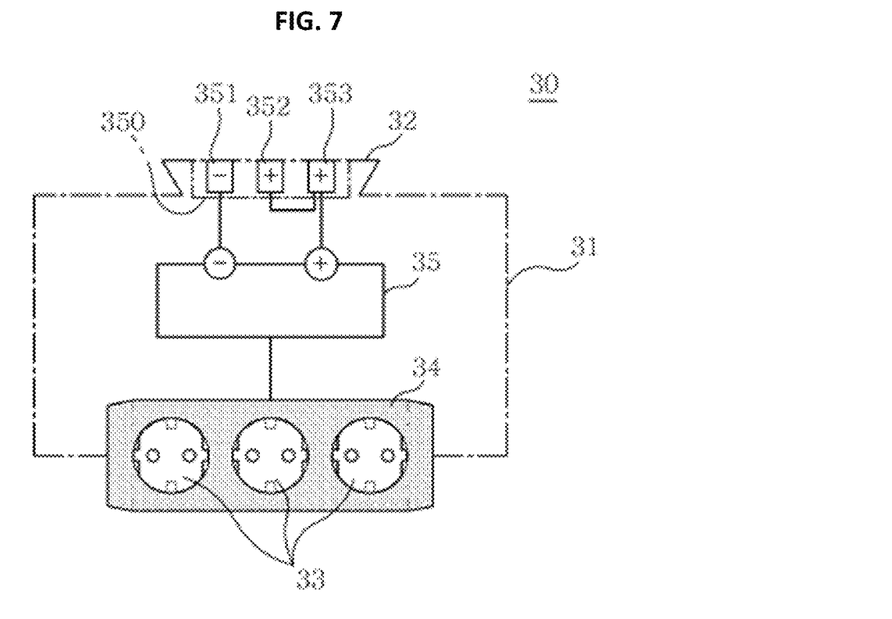
FIG. 7 illustrates an electric wiring connection structure of an example of the power draw module according to the present invention.

As shown in FIG. 6, an embossed coupling portion 32 of the power draw module 30 is formed in one region of an upper surface of a case 31, and electrode terminals 351, 352, and 353 are formed in one region of the upper surface of the case. In addition, sockets 33 are formed in one side surface of the case 21 so as to be exposed to the outside such that a plug of an external electric device can be connected thereto.

In the power draw module of the present invention, a shape of the case 31 is not particularly limited, and the case 31 may have various shapes such as a rectangular shape and a cylindrical shape. The embossed coupling portion 32 may have any shape as long as the shape is an embossed structure. The embossed coupling portion 22 desirably has a shape corresponding to an engraved coupling portion of an air-zinc battery module which is stacked directly thereon, so as to be fixed and coupled when inserted into the engraved coupling portion.

Any shape and position of the electrode terminals 351, 352, and 353 formed on the upper surface are possible as long as the shape and position are exposed at the one region of the upper surface of the case 31. It is desirable that the electrode terminals 351, 352, and 353 are located at a position capable of contacting electrode terminals formed on a lower surface of the air-zinc battery module stacked directly thereon. In an example of FIG. 6, the electrode terminals 351, 352, and 353 have a bar shape and are exposed at a portion of the upper surface of the case 31, at which the embossed coupling portion 32 is located.

Describing an internal structure of the power draw module, an inverter and a socket portion are included in the case. A male switching connector is formed in one region of the upper surface of the case so as to be connected to a female switching connector of an air-zinc battery module which is stacked directly thereon. The male switching connector has two positive terminals and one negative terminal formed so as to correspond to terminals of the female switching connector of the air-zinc battery module which is stacked directly thereon. The positive terminals of the male switching connector are connected to each other through electric wiring. The positive terminal of the positive terminals of the male switching connector, which is not connected to a positive terminal of the female switching connector connected to a positive terminal of a fan of the air-zinc battery module which is stacked directly thereon, is connected to a positive terminal of the inverter through electric wiring. The negative terminal of the male switching connector is connected to a negative terminal of the inverter through electric wiring. When the male switching connector is connected to the female switching connector of the air-zinc battery module which is stacked directly thereon, a current flows in battery units of the air-zinc battery module which is stacked directly thereon, and concurrently, the fan is driven. When the male switching connector is disconnected, the current flow is stopped in the battery units of the air-zinc battery module which is stacked directly thereon, and the driving of the fan is stopped. The inverter is electrically connected to the socket portion to which a plug of an external electric device can be connected.

For further understanding of an internal electric wiring structure of the power draw module, a description will be made through an example shown in FIG. 7. FIG. 7 illustrates an electric wiring connection structure of an example of the power draw module according to the present invention. As shown in FIG. 7, a male switching connector 350 is located in a case 31 of a power draw module 30 such that electrode terminals 351, 352, and 353 are exposed at a portion of the upper surface of the case 31, at which an embossed coupling portion 32 is located, the male switching connector 350 being connected to a female switching connector of an air-zinc battery module stacked directly thereon. The male switching connector 350 has two positive terminals 352 and 353 and one negative terminal 351 formed so as to correspond to the female switching connector of the air-zinc battery module stacked directly thereon. In particular, the two positive terminals 352 and 353 of the male switching connector 350 are connected to each other through electric wiring. The positive terminal 353 of the positive terminals of the male switching connector, which is not connected to a positive terminal of the female switching connector connected to a positive terminal of a fan of the air-zinc battery module which is stacked directly thereon, is connected to a positive electrode of an inverter 35 through electric wiring. The negative terminal 351 of the male switching connector is connected to a negative electrode of the inverter 35 through electric wiring.

In addition, since the inverter 35 of the power draw module 30 is electrically connected to a socket portion 34 in which the sockets 33 are formed, electric energy generated in the air-zinc battery assembly of the present invention can be supplied to an external electric device when a plug of the external electric device is connected to the sockets 33.

According to the air-zinc battery assembly of the present invention, since the air-zinc battery modules are easily stacked and used in accordance with a current specification required in an electric appliance to which the air-zinc battery modules are applied, even a single air-zinc battery assembly can be easily and simply customized to various electric products having different current specifications.

Although the embodiments of the present invention have been disclosed for illustrative purposes, those skilled in the art will appreciate that a variety of different modifications and variations are possible, without departing from the technical conception and essential features of the invention. Also, the scope of the present invention is defined by the following claims rather than by the detailed description of the illustrative embodiments, and all modifications and variations conceived from the meaning and scope of the claims and their equivalents should be understood as falling within the scope of the present invention.

The invention claimed is:

1. An air-zinc battery assembly comprising:
   a first air-zinc battery module having a first surface and a second surface opposite to the first surface, the first air-zinc battery having a first coupling portion embossed or engraved on the first surface;
   at least one second air-zinc battery module having a first surface and a second surface opposite to the first surface of the at least one second air-zinc battery module, the at least one second air-zinc battery module having a second coupling portion embossed or engraved on the first surface of the at least one second air-zinc battery module and be engaged with and coupled to the first coupling portion, and a third coupling portion embossed or engraved on the second surface the at least one second air-zinc battery module; and
   a power draw module having a first surface and a second surface opposite to the first surface of the power draw module, the power draw module having a fourth coupling portion embossed or engraved on the first surface of the power draw module and be engaged with and coupled to the third coupling portion.

2. The air-zinc battery assembly of claim 1, wherein the first coupling portion and the third coupling portion have the same shape;
the second coupling portion and the fourth coupling portion have the same shape; and
widths of the first coupling portion, each of the second and third coupling portions, and the fourth coupling portion are gradually reduced as going away from outer surfaces of the first air-zinc battery module, the second air-zinc battery module, and the power draw module, respectively.

3. The air-zinc battery assembly of claim 1, wherein a first female switching connector is formed in one region of the first coupling portion to transmit electric energy generated in the first air-zinc battery module;
a first male switching connector connected to the first female switching connector is formed in one region of the second coupling portion;
a second female switching connector is formed in one region of the third coupling portion to transmit electric energy generated in the first and second air-zinc battery modules; and
a second male switching connector connected to the second female switching connector is formed in one region of the fourth coupling portion.

4. The air-zinc battery assembly of claim 3, wherein the first air-zinc battery module includes:
a first case having an accommodation space formed therein;
a first battery unit group installed in the accommodation space inside the first case, the first battery unit group comprising a plurality of battery units connected to each other and each comprising stacked air-zinc battery cells, the first battery unit group having a positive electrode and a negative electrode;
a first fan installed in the accommodation space inside the first case to guide an air flow, the first fan having a positive terminal and a negative terminal; and
the first female switching connector electrically connected to the first battery unit group and the first fan.

5. The air-zinc battery assembly of claim 4, wherein the first female switching connector has two positive terminals comprising a first positive terminal and a second positive terminal and a negative terminal;
the first positive terminal is connected to the positive electrode of the first battery unit group;
the second positive terminal is connected to the positive terminal of the first fan; and
the negative terminal is connected to the negative electrode of the first battery unit group and the negative terminal of the first fan.

6. The air-zinc battery assembly of claim 5, wherein the negative terminal of the first female switching connector is connected to the negative electrode of the first battery unit group through electric wiring; and
the electric wiring connecting the negative terminal of the first female switching connector and the negative electrode of the first battery unit group is connected to the negative terminal of the first fan in a side branch form.

7. The air-zinc battery assembly of claim 5, wherein the second air-zinc battery module includes:
a second case having an accommodation space formed therein;
a second battery unit group installed in the accommodation space inside the second case, the second battery unit group comprising a plurality of battery units connected to each other and each comprising stacked air-zinc battery cells, the second battery unit group having a positive electrode and a negative electrode;
a second fan installed in the accommodation space inside the second case to guide an air flow, the second fan having a positive terminal and a negative terminal;
the first male switching connector connected to the first female switching connector when the first coupling portion and the second coupling portion are coupled; and
the second female switching connector electrically connected to the second battery unit group and the second fan.

8. The air-zinc battery assembly of claim 7, wherein the first male switching connector has two positive terminals comprising a first positive terminal and a second positive terminal and a negative terminal;
the two positive terminals of the first male switching connector are electrically connected to each other;
the first positive terminal of the first male switching connector is not connected to the second positive terminal of the first female switching connector and is connected to the positive electrode of the second battery unit group; and
the negative terminal of the first male switching connector is connected to the negative electrode of the second battery unit group and the negative terminal of the second fan.

9. The air-zinc battery assembly of claim 7, wherein the second female switching connector has two positive terminals comprising a first positive terminal and a second positive terminal and a negative terminal;
the first positive terminal of the second female switching connector is connected to the positive electrode of the second battery unit group;
the second positive terminal of the second female switching connector is connected to the positive terminal of the second fan; and
the negative terminal of the second female switching connector is connected to the negative electrode of the second battery unit group and the negative terminal of the second fan.

10. The air-zinc battery assembly of claim 9, wherein the negative terminal of the second female switching connector is connected to the negative electrode of the second battery unit group through electric wiring; and
the electric wiring connecting the negative terminal of the second female switching connector and the negative electrode of the second battery unit group is connected to the negative terminal of the second fan in a side branch form.

11. The air-zinc battery assembly of claim 9, wherein the power draw module includes:
a third case having an accommodation space formed therein and one surface on which the fourth coupling portion is formed;
a socket portion installed in the accommodation space inside the third case such that a plug of an external electric device is connected thereto;
an inverter installed in the accommodation space inside the third case and electrically connected to the socket portion, the inverter having a positive electrode and a negative electrode; and the second male switching connector connected to the second female switching connector when the third coupling portion and the fourth coupling portion are coupled.

12. The air-zinc battery assembly of claim 11, wherein the second male switching connector has two positive terminals comprising a first positive terminal and a second positive terminal and a negative terminal provided;
- the two positive terminals of the second male switching connector are electrically connected to each other;
- the first positive terminal of the second male switching connector is not connected to the second positive terminal of the second female switching connector and is connected to the positive electrode of the inverter; and
- the negative terminal of the second male switching connector is connected to the negative electrode of the inverter.

* * * * *